United States Patent
Johnson

Patent Number: 5,938,722
Date of Patent: Aug. 17, 1999

[54] METHOD OF EXECUTING PROGRAMS IN A NETWORK

[75] Inventor: William J. Johnson, Flower Mound, Tex.

[73] Assignee: MCI Communications Corporation, Washington, D.C.

[21] Appl. No.: 08/950,453

[22] Filed: Oct. 15, 1997

[51] Int. Cl.$^6$ ........................................ G06F 13/00
[52] U.S. Cl. ........................................ 709/105; 709/226
[58] Field of Search .................................. 395/675, 674, 395/200.56; 709/226

[56] References Cited

U.S. PATENT DOCUMENTS

| | | | |
|---|---|---|---|
| 5,115,505 | 5/1992 | Bishop et al. | 709/5 |
| 5,283,897 | 2/1994 | Georgiadis et al. | 709/6 |
| 5,522,070 | 5/1996 | Sumimoto | 709/5 |
| 5,539,883 | 7/1996 | Allon et al. | 709/6 |
| 5,740,371 | 4/1998 | Wallis | 709/226 |

FOREIGN PATENT DOCUMENTS 648038  4/1995  European Pat. Off. .

OTHER PUBLICATIONS

Munetomo et al.; "A Genetic Appraoch to Dynamic Load Balancing in a Distributed Computer System"; IEEE World Congress on Computational Intelligence; pp. 418–421, Jun. 1994.

Tsai et al.; "Load Balance Facility in Distributed MINIX System"; Euromicro 94; pp. 162–169, Sep. 1994.

*Primary Examiner*—Zarni Maung
*Assistant Examiner*—Kenneth R. Coulter

[57] ABSTRACT

A method of executing a program in a network environment that includes a source machine and a plurality of target machines, in which the source machine determines target machine eligibility according to configured constraints and selects a target machine from a list of target machines eligible to execute the program. The source machine transmits to the selected target machine an execution command for the program, together with the list of target machines, and a handle. The selected target machine launches the program and routes input and output requests to the source machine. The selected target machine monitors execution of the program. If performance constraints for the program are exceeded, or in response to a user initiated request, the selected target machine preempts execution of the program and roves the program to a selected next available target machine of the network. The selected next available target machine begins executing the preempted program at the point where the selected target machine preempted execution. The selected next available machine can rove the program to another machine of the network. Programs are executed to a network rather than to a machine.

30 Claims, 12 Drawing Sheets

METHOD OF EXECUTING PROGRAMS IN A NETWORK

FIELD OF THE INVENTION

The present invention relates generally to executable programs, and more particularly to a method of executing a program in a communications network in which the program executes dynamically anywhere in the network.

DESCRIPTION OF THE PRIOR ART

Currently, multitasking operating systems within a data processing system make use of one or more processors in order to execute a plurality of applications. The processors are located local to the data processing system. There is no method for spawning an application to a network of machines. Also, there is no method for a single program execution on a plurality of networked data processing systems, whereby the program executes on a particular data processing system at a particular point in time in accordance with current performance and load balance criteria of the data processing systems. A need exists for managing a plurality of applications to be executed into a network of machines without regard for what machine or machines actually execute the applications. Such a method should allow load balancing applications to available machines in the network according to user or application preferences.

SUMMARY OF THE INVENTION

The present invention provides a method of executing a program in a network environment that includes a source machine and a plurality of target machines. The source machine selects an available target machine from a user configureable list of target machines capable of executing the program. Each candidate target machine in the list has an associated user configureable performance predicate that dictates how the program will be executed in the network (i.e., possible roving). The source machine transmits to the selected target machine the program to be executed along with any parameters, together with the list of candidate target machines, and a handle. The handle uniquely identifies the program in the network with the source machine. The selected target machine launches the program and registers the program with a program identifier and handle in a termination table maintained by the selected target machine. The source machine registers the program (as being launched to a target machine) in an origination table maintained by the source machine.

The selected target machine routes input and output requests for the program to the source machine as necessary. Preferably, the selected target machine spawns standard input and output threads. The selected target machine registers the spawned standard input and output threads in the termination table with thread identifiers.

The selected target machine monitors execution of the program. Preferably, the selected target machine spawns a resource validation thread. The resource validation thread periodically determines if performance constraints for the program are being met. If the resource validation thread determines performance constraints for the program are not being met, the selected target machine roves the program to another target machine of the network in the list of target machines. An eligible target machine must first satisfy performance constraints before being roved to. A user may also initiate a request to manually rove the program from one machine to another.

After selecting a next available target machine, the selected target machine preempts execution of the program and saves program execution state information for the preempted program. The selected target machine transmits to the selected next available target machine the saved program execution information, the list of target machines, and the handle. Upon transmission to the selected next available target machine, the selected target machine kills the program and all threads associated with it, and deletes the program identifier and the handle for the program from its termination table.

The selected next available machine moves the saved program execution information transmitted from the selected target machine into memory, performs memory fix-up, and begins executing the preempted program at the point where the selected target machine preempt execution. The selected next available machine registers the program with a program identifier and the handle in its termination table. The selected next available machine, in turn, also monitors execution of the program and routes input and output requests to the source machine in the same way that the prior selected machine did. The present invention allows execution of the program to be roved seamlessly from machine to machine throughout the network as dictated by configured tolerances of performance criteria of each target machine. Thus, a user executes programs to a network rather than to particular machine.

DESCRIPTION OF THE PREFERRED EMBODIMENT

Figure 1:
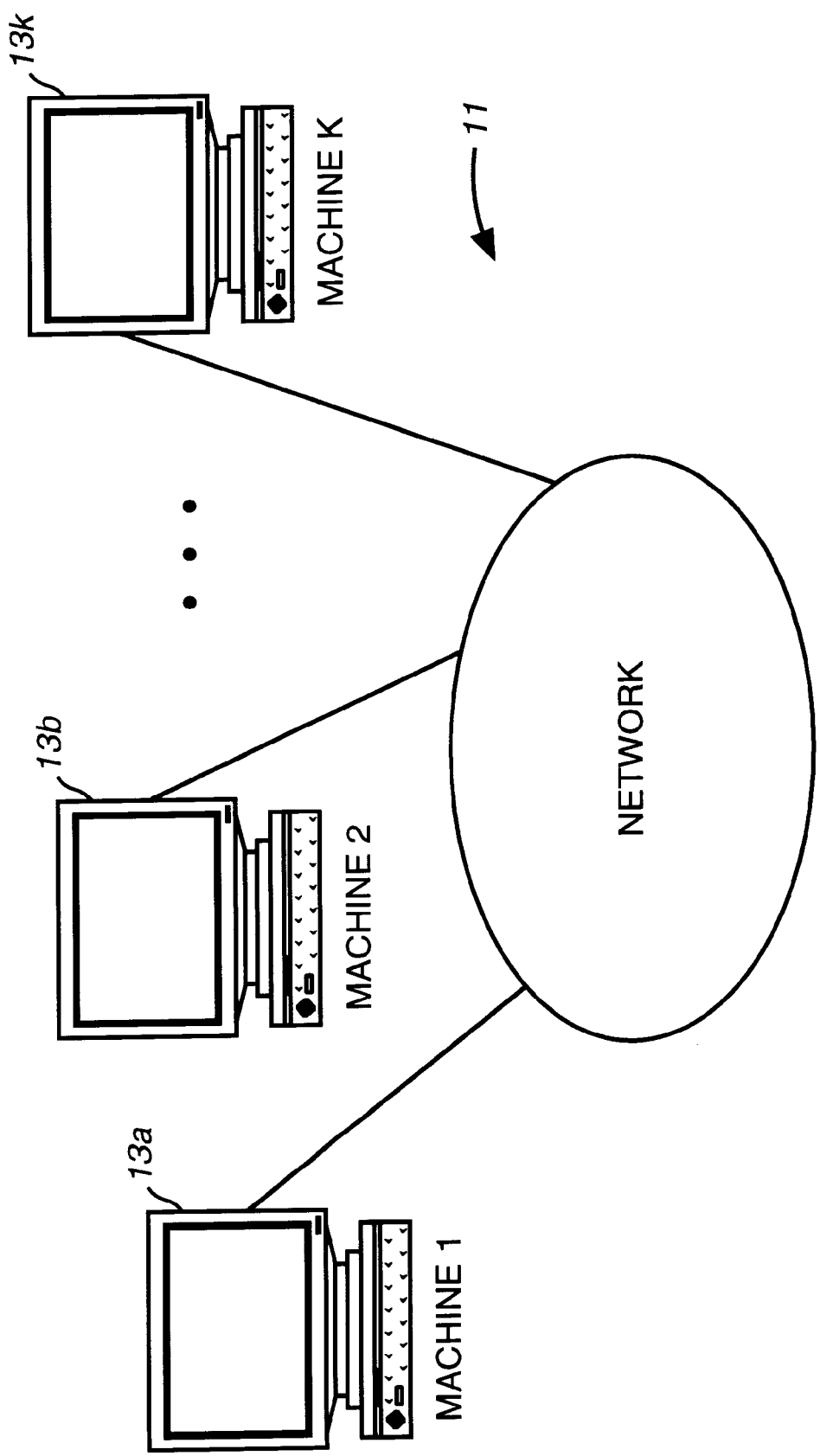
FIG. 1 is a diagram of a network of personal computers.

Referring to FIG. 1, a network is designated generally by the numeral 11. Network 11 includes a plurality of interconnected machines 13. In the preferred embodiment, each machine 13 is a personal computer operating in a local network environment. However, the present invention is applicable to other executable programs in other communications network environments, such as Automatic Response Units (ARUs) in telephone systems. Each machine 13 is identified uniquely in the network by a unique machine address (MA). The machine address can take any of several embodiments, such as physical communications adapter address, local adapter address, hardware serial number, logical name, TCP/IP address, or the like, provided that the addressing scheme is consistent and unambiguous within the network environment. The machine addresses provide a means by which each machine in the network can be uniquely identified.

According to the present invention, and as will be explained in detail hereinafter, a machine 13 can cause a program to execute on any qualified machine 13 of the network. A qualified machine is one that meets specified performance constraints and is configured to accept programs spawned from another machine in the network. From the user's point of view, programs are spawned to the network, rather than to a particular machine of the network. However, program execution is performed on only a single machine at a time. The machine that executes the program sends input and output requests to the machine that spawned the program. The execution of a program can be moved from one remote machine in the network to another remote machine in the network automatically or in response to user requests. Premature termination of a remotely spawned program is also supported.

Performance constraints can be specified for target machines for executing a program. The performance constraints govern automatic roving of the program among a plurality of remote machines in order to execute the program. When a particular data processing system no longer satisfies performance criteria during execution of the program, the executing machines determines a next available target machine that is qualified and the program is roved to that machine automatically and transparently to the user. A query facility is provided so that the user may determine where in the network the program is currently executing.

Thus, according to the present invention, a user operating, for example machine 13a, can launch a program to network 11. The system will cause the program to be executed on another machine in the network, for example machine 13b. Machine 13a will receive output from the program, and requests for input to the program will come from machine 13b to machine 13a. Thus, it will appear to the user that the program is executing on the user's machine 13a. If, during the course of execution of the program, machine 13b fails to meet performance constraints for the program, machine 13b will attempt to rove the program to another qualified machine of the network, such as machine 13k. During roving, execution of the program is preempted on machine 13b and then started from the point of preemption on machine 13k. Thus, the user of machine 13a continues to experience essentially uninterrupted execution of the program.

In one embodiment, a telephone user interfaces to an ARU (e.g. Voice Response Unit) program with a Dual Tone Modulation Frequency (DTMF) interface. The telephone user dials into the network and the call is routed to the ARU program via one or more call distributors. The telephone user transmits DTMF input to, and receives voice message response from, the ARU program which is automatically invoked and executes according to the present invention. DTMF input is standard input (STDIN) to the ARU program and voice messaging is standard output (STDOUT)from the program.

Figure 2:
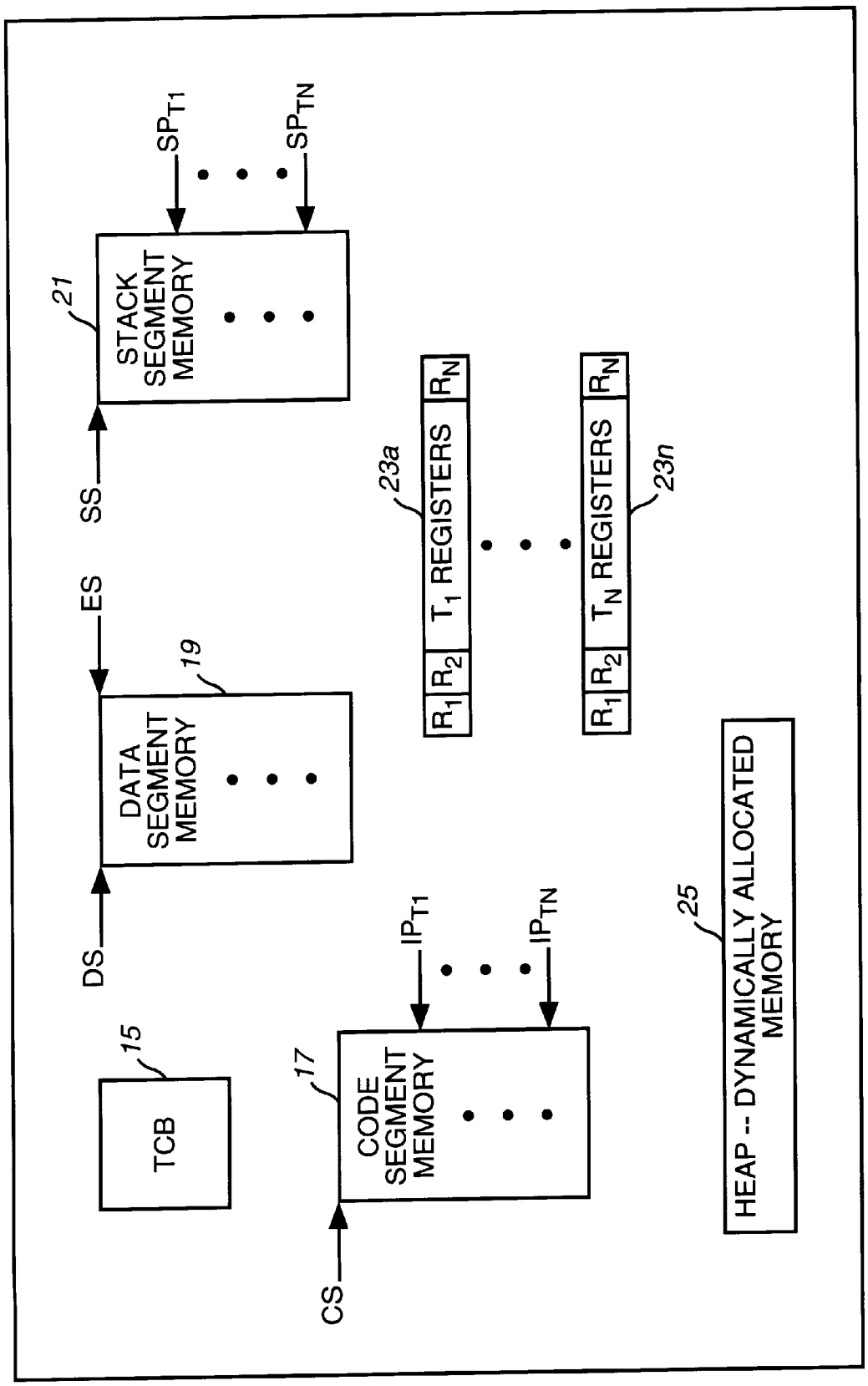
FIG. 2 is a block diagram of an executable program in a flat memory model.

Referring now to FIG. 2, an executable program, in a flat memory model (e.g., 32 bit), is illustrated. Any state of an executable program executing within a data processing system can be characterized as including a task control block (TCB) 15, which describes the executable program's vital signs. A code segment 17 contains executable instructions. A CS pointer points to the start of the code segment and instruction pointers (IPs) point to the next instruction for execution for all threads of the process. The code segment memory size depends on the size of the program that is compiled and linked. A data segment memory 19 contains static variables with DS and ES pointers pointing to the start of the segment. References to the DS and ES by the code segment are offsets from the DS/ES pointer. The data segment size depends upon the amount of global and static data required by the program that is compiled and linked. A stack segment memory 21 contains pushed or popped function parameters and local context variables. An SS pointer points to the start of the stack segment memory, and stack pointers (SPs) point to the current top of the stack for all threads executing in the program. A stack may grow to lower memory addresses as known in the Intel architecture. The stack segment memory size is set as a link parameter. A set of registers 23 are provided for each thread in the process. The registers 23 contain values or addresses as dictated by instructions in code segment memory 17. Depending on the machine architecture embodiment, there may be special purpose registers, general purpose registers, or a combination thereof. A heap 25 contains all unfreed dynamically allocated memory up to the current context. There may be no, one, or more open files for reading and writing.

As known to those skilled in the art, programs also make use of dynamic link libraries (DLLs) during program execution. A well-behaved DLL includes only a code segment, although DLLs can be developed to include a data segment. Typically, the data segment, stack segment and registers of the calling program are used. DLLs should not maintain static data because many programs may share a single DLL; however, DLLs can be developed for managing their own static data for requirements in some environments.

Task control block 15 contain many fields, as known to those skilled in the art. Fields of importance to the present invention that are accessed from the task control block are the process description section, the thread description sections, the dynamic memory allocation section, and the file I/O section (0, 1, or more files that may be opened and accessed at any particular time). The process description section includes:

Process_id,
CS, CS length, CS pointer;
DS, DS length, DS pointer, ES pointer;
SS, SS maximum length, SS pointer;
DS PIM offset DS, SS PIM offset in DS (bits for PIM bytes are set to 0 for value);
Pointer to first linked list PIM for dynamically allocated memory; and,
Currently accessed DLLs, CS, CS length, DLL DL, and DLL DS length.

The thread description sections include, for each thread:

Thread_id;
IP for this thread;
SP for this thread;
Thread address segment;
Set of registers; and,
Register PIM offset in DS.

The dynamic memory allocation section contains a list of pairs, such that each pair is a memory address, and the length of the memory allocated to that address. The file I/O section describes any open files by path, access type opened with, and a cursor position.

The task control block (TCB) for a program contains a process identifier, a list of thread identifiers, dynamically allocated memory references, segment descriptions, and any open file parameters. This allows the program or a DLL to be preempted or swapped in a multitasking system. Swapping causes the CS pointer to be moved. The DS and CS pointers cannot be moved because values or addresses therein may no longer be valid upon being moved. The present invention allows movement of any segment in memory because address and value information is tracked by means of program interpretation masks (PIMs).

Figure 3:
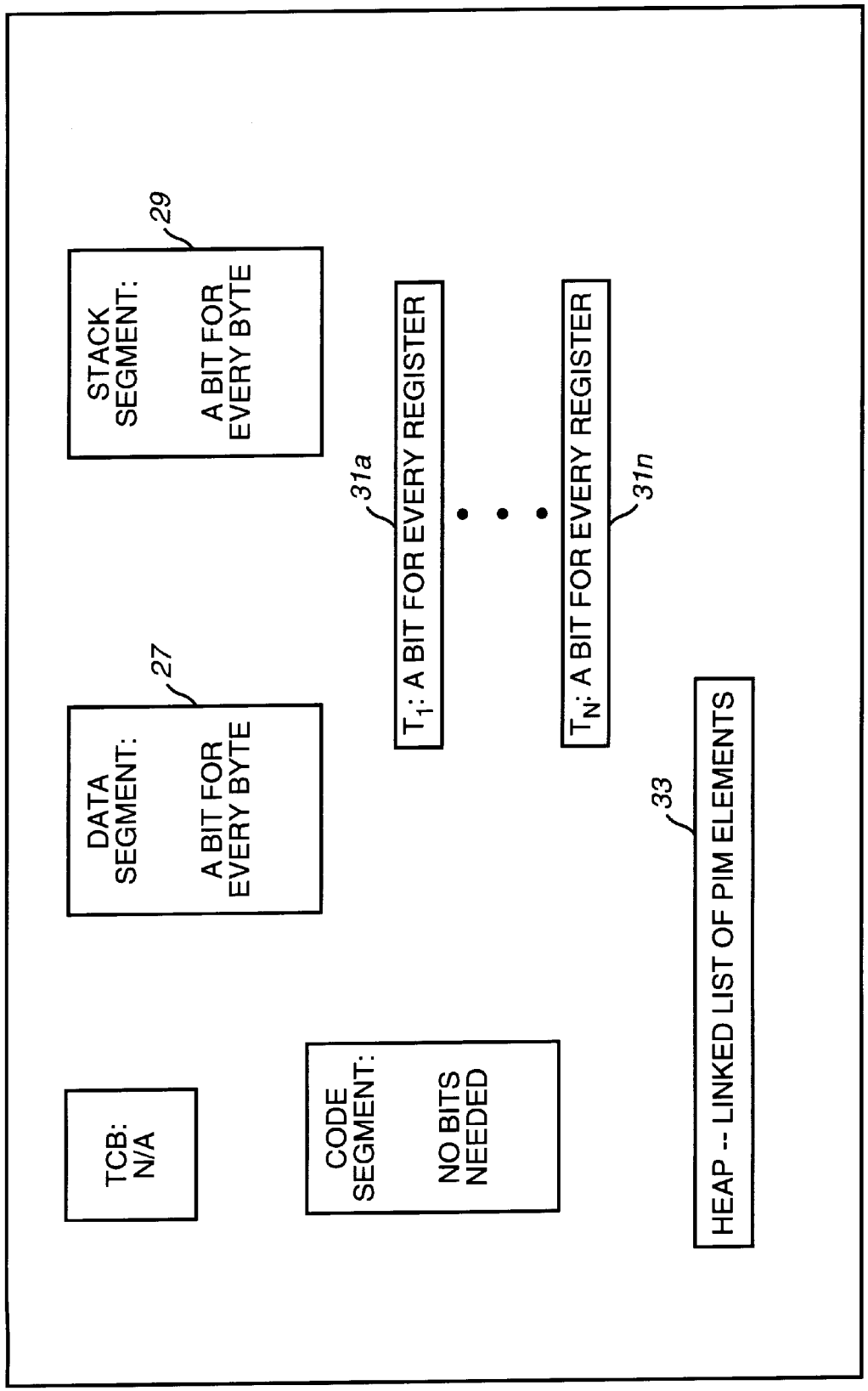
FIG. 3 is a block diagram of executable program masks according to the present invention.

Referring now to FIG. 3, there is shown a diagram of program interpretation masks (PIMs). The memory portion of a PIM keeps track of every byte in the executing program's data segment and stack segment memories, to identify whether a byte is a value or an address at any point in the execution of the associated program. A data segment PIM 27 contains a bit for every DS/ES in data segment memory 19 of FIG. 2. Each bit of data segment PIM 27 indicates whether a corresponding byte is an address or value at that location. Similarly, a stack segment PIM 29 maintains a bit for every byte in stack segment memory 21 of FIG. 2. In a 32-bit flat memory model, an address indicator will always be a contiguous set of four bits in a PIM. A bit set to one indicates an address and a bit set to zero indicates a value. A set of register PIMs 31 keep track of every register value for each thread.

PIMs are of sufficient length to identify each bit in their respective memory. Thus, the data segment PIM contains a number of bits equal to the number of bytes in the data segment. Similarly, the stack segment PIM contains the number of bits equal to the maximum number of bytes in the stack segment, with the setting of bits of the stack segment PIM growing or shrinking according to stack use. A register PIM 31 includes a number of bits equal to the number of registers 23 for a thread. A program is linked with PIM generation code for dynamically allocated memory 33. The PIM generation code maintains a linked list of PIMs for each individual piece of dynamically allocated memory. Each PIM in the linked list contains a length of the element and a bit mask of appropriate length for the particular element. Element order in the linked list corresponds to the pair list order in the TCB.

The compiler, assembler, and/or linker has responsibility to output the data segment PIM, stack segment PIM, and register PIM for every compiled and linked program. The compiler or assembler inserts set bit instructions at the appropriate destinations in the code segments for maintaining PIMs properly at any given context of the code segment. It is the programmer's responsibility to ensure absolute data processing system addresses are not referenced by the program. However, a preferred embodiment of a compiler, or assembler, will provide a special option to the compiler or assembler for flagging errors associated with programs that may be roved to arbitrary machines. Additionally, a special option can be used to indicate to the compiler, or assembler, that the program may be roved and therefore PIMS should be maintained. Addressing references are to be made as offsets from DS, ES, or SS.

Any DLL that is in context during program preemption is roved with the program, otherwise the DLL will be loaded upon first call at the target machine. Should the TCB of a DLL indicate there is a data segment, the DLL data segment is also roved with the calling program. Because a DLL can be shared by many threads or processes, the DLL data segment will be copied if other programs are accessing the DLL. The DLL will be moved, i.e., deleted from the current machine's memory before roving, if no other program is accessing the DLL. All DLLS which are touched by a program are roved with the program if, and only if, preemption context is within the DLL code segment.

Shared memory is useful for sharing data between two or more independent processes. If one program was roved to another machine, the shared memory and all of the programs that access the shared memory would have to be roved as well, or a method would be required for accessing shared memory from remote machines. In either case, shared memory management is a problem not addressed by this invention. A single process, which can have many threads which share data in the data segment, is assumed by the present invention. A collection of independent threads always performs better than a collection of independent processes, although there are cases in which independent processes may be necessary.

The present invention defines a special file called a Qualifile for specification with all programs to be executed according to the present invention. A Qualifile qualifies all machines in the network that are candidates for executing a program. A Qualifile further qualifies performance constraints for each machine so that the best candidates are selected for execution. In the preferred embodiment, the Qualifile is preferably a flat ASCII file that takes the form:

$MA_1; P_1$

. . .

$MA_n; P_n$ where $MA_i$ is a machine address of a system capable of multitasking with a suitable architecture, and $P_i$ is a predicate that governs whether or not machine $MA_i$ meets criteria for executing the particular program. $P_i$ is a conjunctive condition that elaborates to a boolean. Thus, a Qualifile entry such as $MA_1; ((M \div 16 m)\&\&(P<6))\|(!S)$ means execute the particular program at machine $MA_1$ if, and only if, the available RAM is greater than or equal to 16 megabytes AND the number of process executing there is less than 6 OR there is no swapping in progress. The predicate expression may take on many syntactic and semantic embodiments within the scope of the invention, including references for CPU utilization, numbers of threads, amount of heap space used, whether a user is actively using the target system, etc. In a Windows/NT environment, the registry file will be accessed for comparing performance criteria to expressions in a predicate, in order to assess the result of the predicate.

Figure 4:
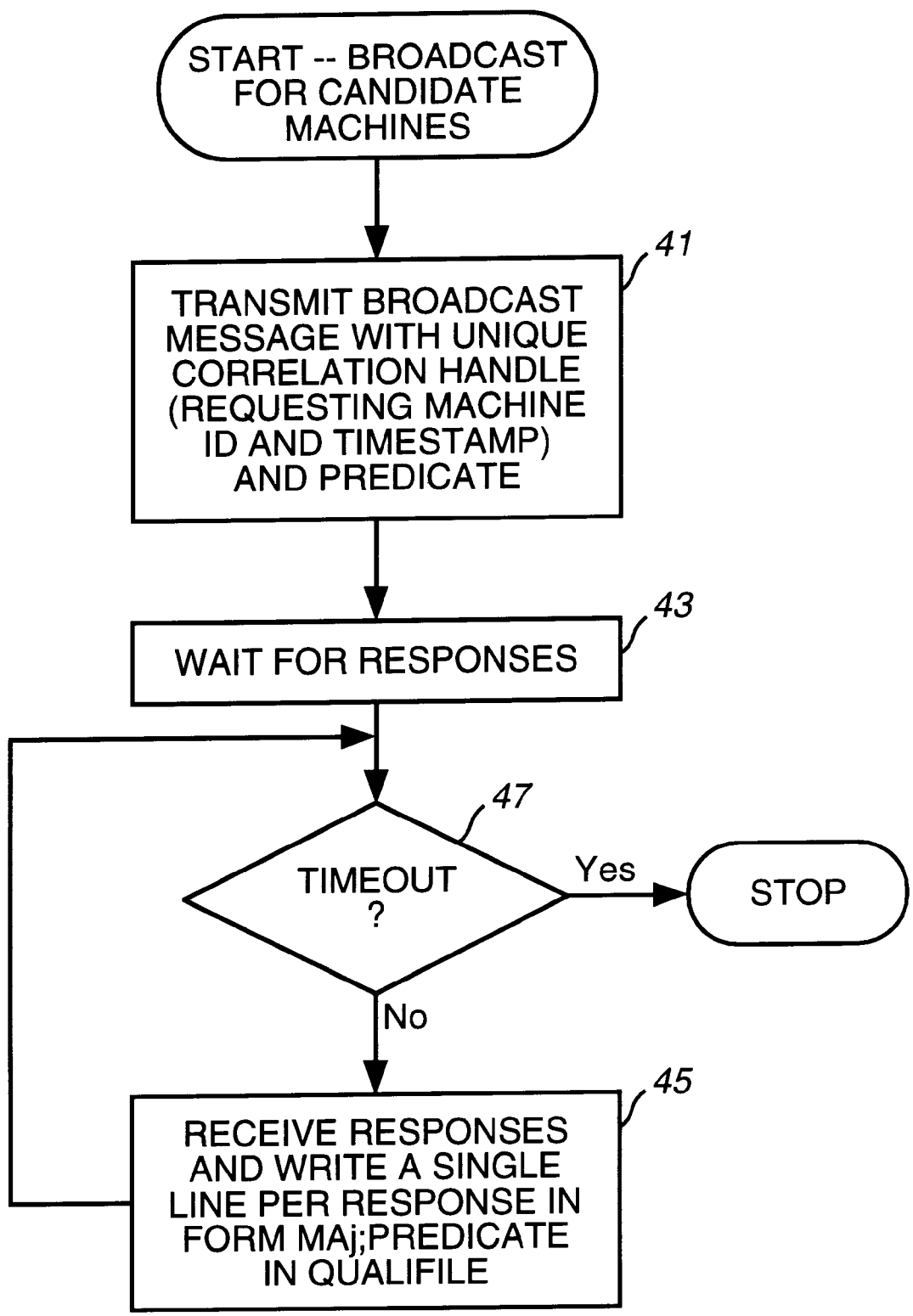
FIG. 4 is a flowchart of broadcast for candidate machines processing according to the present invention.

Referring now to FIG. 4, there is shown a flow chart of the processing involved in automatically building a Qualifile for a program. A Qualifile is a flat ASCII file that can be created with an editor, or automatically created through redirected output according to FIG. 4.

First, the source machine transmits a broadcast message with a unique correlation handle, which is the requesting machine's network address and a time stamp (time of transmit), and a performance criteria predicate, as discussed above, at block 41. Then, the source machine waits for responses from machines on the network, at block 43. As will be explained in detail with respect to FIG. 13 (blocks 253, 255, 257), when the target machines receive the broadcast message, each target machine produces a boolean for its local candidate configuration and the predicate. Machines in the network, which are eligible target machines, maintain a local candidate configuration that contains a list of machine addresses permitted to be valid source machines or intermediary target rove machines (i.e., permitted to spawn or rove programs to the target machine). This allows control over who can spawn programs to which machines. The local candidate configuration is preferably embodied as a file.

If the source machine's address is in the target machine's local candidate configuration and the target machine satisfies the performance criteria predicate, the target machine transmits an acknowledgment back to the source machine. If the source machine address is not in the target machine's local candidate configuration, or the target machine does not satisfy the predicate, then the target machine does not respond to the broadcast message. The source machine receives responses and writes a single line per response in the form $MA_j$; predicate to standard output (STDOUT). The user who invokes FIG. 4 can redirect STDOUT to a file, namely, the Qualifile, as indicated at block 45. This allows convenient building of Qualifiles. An editor may then be used on the Qualifile for further fine tuning. The source machine continues to receive responses and write to the Qualifile until processing times out at decision block 47 and FIG. 4 processing stops. At the conclusion of FIG. 4 processing, the source machine has built the Qualifile for the program.

Figure 5:
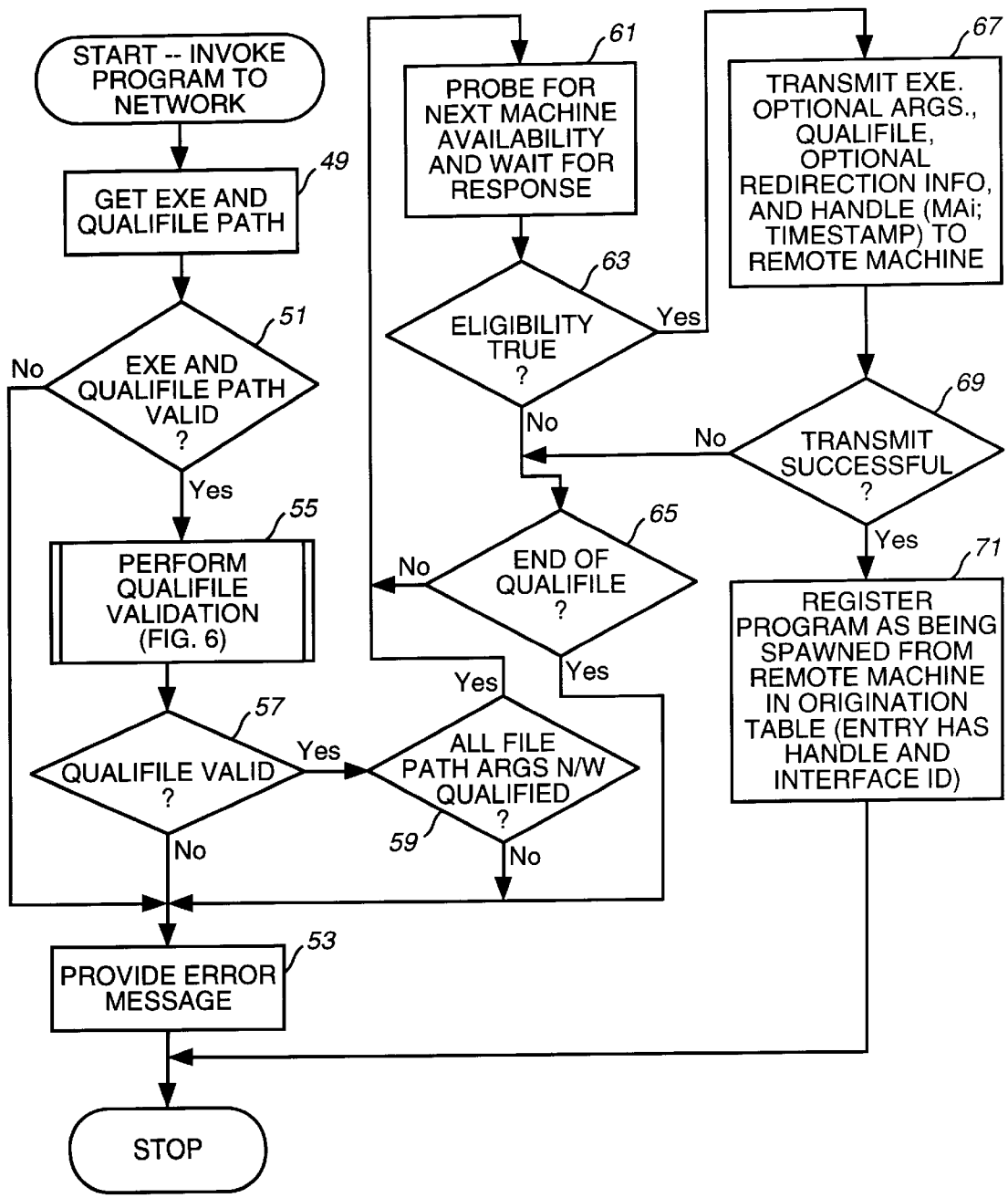
FIG. 5 is a flowchart of invoke program to the network processing according to the present invention.

Referring now to FIG. 5, there is shown source machine processing to invoke a program to the network, for example when a user wants to execute a program. First, the source machine gets the program's EXE and Qualifile path, at block 49, as invoked. Then, the source machine tests, at decision block 51, whether or not the EXE and Qualifile path are valid. If not, the source machine provides an error message, at block 53, and processing ends. If the EXE and Qualifile path are valid, then the source machine performs Qualifile validation, as indicated generally at block 55 and shown in detail with respect to FIG. 6. If, at decision block 57, the Qualifile is not valid, then an appropriate error message is provided at block 53 and processing ends. If the Qualifile is not valid, then the user can edit the Qualifile, create a new Qualifile, or start anew by returning to FIG. 4 processing to construct a starter Qualifile.

If, at decision block 57, the Qualifile is valid, then the source machine tests, at decision block 59, whether all file path arguments (if any) are network qualified. If not, an appropriate error message is provided at block 53 and processing ends. File references must be network qualified so that if and when a program is roved among different target machines, the file is the same as known by all participating machines.

If, at decision block 59, all file path arguments are network qualified, then the source machine probes for the first (or next) target machine availability in the Qualifile and waits for a response, at block 61. The probe is a message to the first (or next) machine address in the Qualifile that contains a correlation handle constructed by the source machine's address concatenated with a date/time stamp, and the predicate for the target machine as defined in the Qualifile. As will be explained in detail with respect to FIG. 13, when the probed target machine receives the probe message, it sends back to the probing source machine a boolean (true or false) acknowledgment with the correlation handle in the request received from the source machine. The boolean is based on the target machine's local candidate configuration and the system's constraints according to the predicate. When the probing source machine receives the acknowledgment, it tests, at decision block 63, whether or not the acknowledgment is true (i.e., system is a valid target machine). If not, the probing source machine tests, at decision block 65, whether or not it has reached the end of the Qualifile. If so, an appropriate error message is provided, at block 53 and processing ends. If, at decision block 65, the probing source machine has not reached the end of the Qualifile, then processing continues at block 61 and the next target machine in the Qualifile is probed. If, at decision block 63, the acknowledgment is true, then the source machine transmits the EXE, optional arguments, the Qualifile, any optional redirection information, and a correlation handle (the source machine's machine address and time stamp) to the remote machine, at block 67. The target machine's processing will be discussed in FIG. 13 (blocks 231, 233). If, at decision block 69, the transmission is not successful, then processing continues at decision block 65 in order to find an available target machine for execution of the program. If, at decision block 69, the transmission is successful, then the source machine registers the program as being spawned to a remote (target) machine in an origination table with an entry that contains the correlation handle and an interface identifier for the program, at block 71. The processing then stops. The origination table reflects all programs that have been spawned to a remote (target) machine. It is preferably embodied as a file.

The interface identifier is the handle to the user interface object associated with the spawned program. It is needed for proper routing of input to the program, and output from the program. This enables accepting input from the source machine for routing to the program at the target machine. It also enables routing output from the target machine to the correct user interface object at the source machine Embodiments at the interface identifier are a window handle, a screen group identifier, or a full screen session identifier, along with the type of interface identifier.

Figure 6:
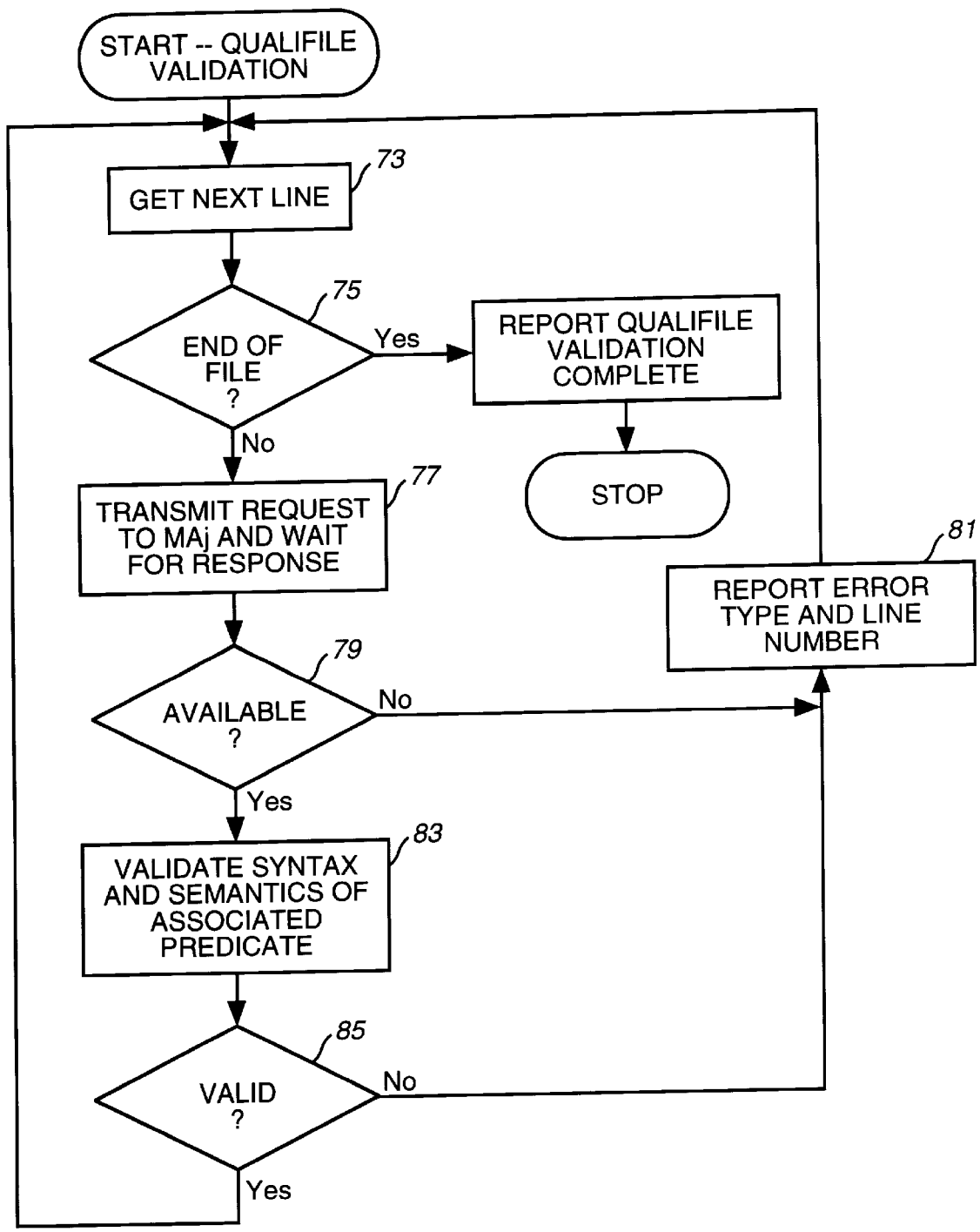
FIG. 6 is a flowchart of qualifile validation processing according to the present invention.

Referring now to FIG. 6, there is shown a flow chart of Qualifile validation, which is indicated generally at block 55 of FIG. 5. Qualifile validation is performed before spawning a program to the network, although the FIG. 6 process should be made available to a user for Qualifile validation at any time. The source machine gets the first (or next) line of the Qualifile at block 73. If, at decision block 75, the end of the Qualifile has not been reached, then the source machine transmits a request message to the target machine of the line fetched at block 73 and waits for a response, at block 77. The request message contains a correlation handle and a null predicate which will always be true. This allows validation that the target's level candidate configuration permits the source to spawn programs there. If, at decision block 79, the target machine responds with "is not available", then an unavailable error is reported at block 81 and processing continues at block 73. If, at decision block 79 the target machine is available, (i.e., target local candidate configuration contains source address), then the source machine validates the syntax and semantics of the associated predicate at block 83. If, at decision block 85, the syntax and semantics are not valid, then an appropriate error is reported at block 81 and processing continues at block 73. If, at decision block 85, the syntax and semantics of the associated predicate are valid, then FIG. 6 processing continues at block 73. Thus, FIG. 6 processing continues until, at decision block 75, the end of the file is reached, at which time the completion of the Qualifile validation processing is reported, at block 87 and FIG. 6 processing ends.

Figure 7:
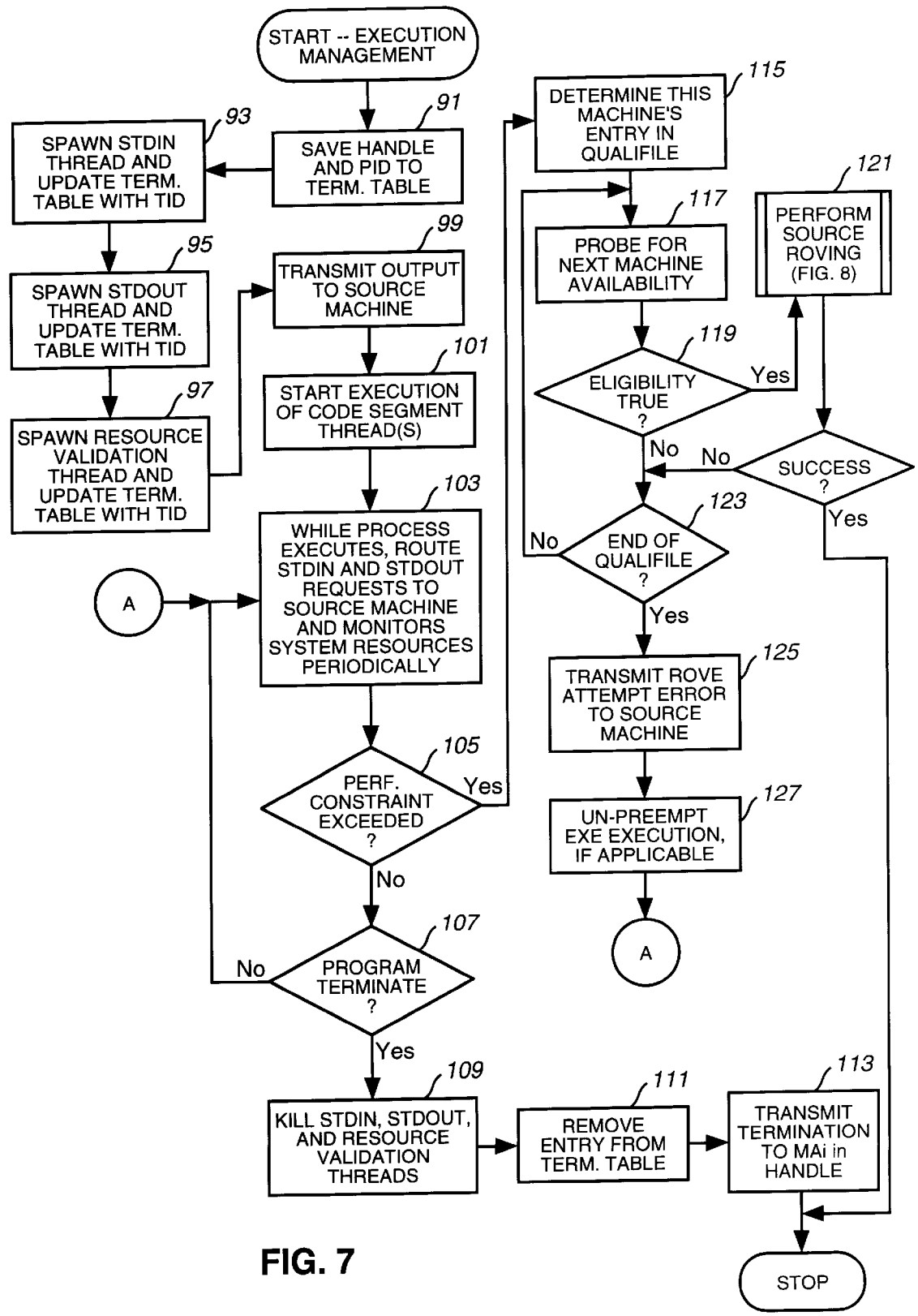
FIG. 7 is a flowchart of program execution management processing according to the present invention.

When a program is newly spawned to the network, the machine upon which the program is executed performs execution management, as shown in FIG. 7. FIG. 7 is integrally coupled to the machine operating system. Referring to FIG. 7, the executing target machine saves the correlation handle and the process identifier (PID) in a termination table, at block 91. The termination table is preferably embodied as a file. The PID is maintained by the operating system as well known to those skilled in the art. Then, the target machine spawns a standard input (STDIN) thread and updates the termination table with the thread identifier, at block 93. Then the target spawns a standard output (STDOUT) thread and updates the termination table with the thread identifier for the STDOUT thread, at block 95. The STDOUT and STDIN threads enable input and output requests to be sent to the spawning source machine. Finally, the target machine spawns a resource validation thread and updates the termination table with the thread identifier for the resource validation thread, at block 97. The resource validation thread monitors performance of the executing target machine during execution of the program to ensure consistency with the Qualifile predicate. After the target machine has spawned the STDOUT and STDIN threads, and the resource validation thread, the target machine transmits an output message back to the spawning source machine, at block 99. The output message is displayed on the source machine indicating to the user which machine the program has spawned to. Block 99 continues to block 101 which starts execution of the code segment thread(s).

As indicated generally at block 103, while the process executes, the target machine routes STDIN and STDOUT requests to the spawning source machine, using the correlation handle, and monitors system resources periodically. STDIN and STDOUT requests are received at the source machine (see FIG. 13 Blocks 205, 206, 207, 209, 211, 212, 217, 219). If, at decision block 105, performance constraints according to the Qualifile predicate for the program at this machine are exceeded, then the executing target machine begins processing to rove the program to another target machine in the network, as will be explained in detail hereinafter. As long as performance constraints are not exceeded, as tested at decision block 105, the executing target machine continues to execute the program until, as determined by decision block 107, the program terminates. If the program terminates, then the target machine kills the STDIN, STDOUT and resource validation threads, at block 109, removes the entry for the program from the termination table, at block 111, and transmits a termination message to the spawning source machine using the correlation handle, at block 113, whereupon execution management in the target machine ends. The source machine receives a normal termination request in FIG. 13 (blocks 221, 223, 225, 227, 229).

Referring again to decision block 105, if performance constraints are exceeded, then the executing target machine finds its own entry in the Qualifile, at block 115, and probes for the availability of the next machine in the Qualifile, at block 117. The probing steps were discussed with respect to invocation of a program to the network as illustrated in FIG. 5 (blocks 61, 63, 65). If, at decision block 119, the acknowledgment from the probed target machine is true (i.e., it is eligible), then the target machine performs source roving, as indicated generally at block 121 and shown in detail in FIG. 8. If, at decision block 119, the acknowledgment is not true, then the target machine tests, at decision block 123 whether or not it has reached the end of the Qualifile. If not, processing continues at block 117 in which the availability of the next target machine in the Qualifile is probed. If, at decision block 123, the end of the Qualifile is reached without having found an available target machine to which the program may be roved, the target machine transmits a rove attempt error output message to the source machine identified in the correlation handle, at block 125. Then, the target machine unpreempts execution of the program, if applicable (i.e., arrival to block 127 by way of block 121), at block 127, and processing continues at block 103.

Figure 8:
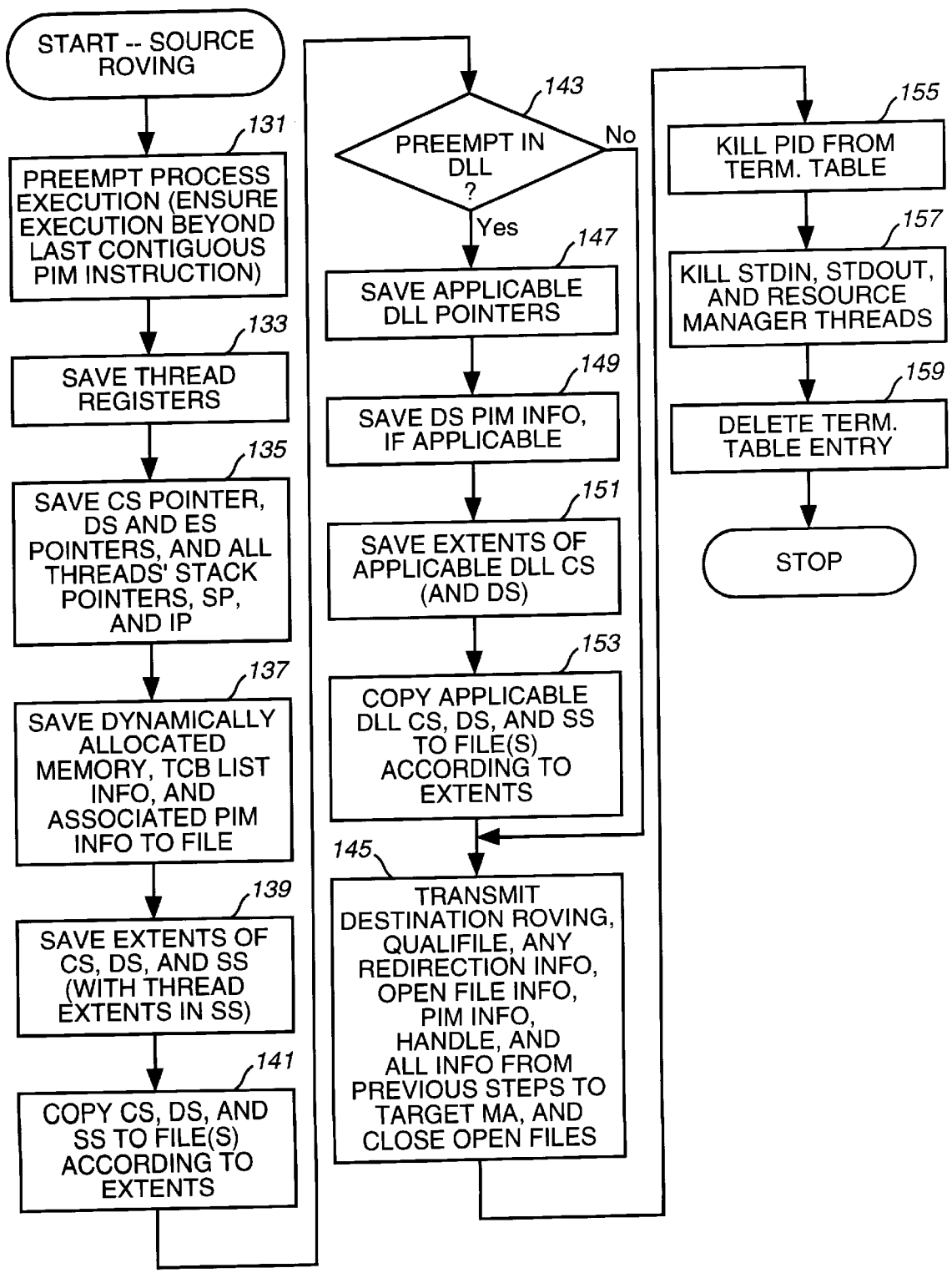
FIG. 8 is a flowchart of source roving processing according to the present invention.

If, at decision block 119, the target machine receives a true acknowledgment, then the target machine performs source roving, as indicated generally at block 121 and shown in detail in FIG. 8. If the source roving is successful, at decision block 129, processing ends. If the source roving is not successful, and the end of the Qualifile has not been reached at decision block 123, the target machine continues to probe for a next available target machine at block 117.

An alternate embodiment of FIG. 7 will loop through all configurations of the Qualifile (starting at beginning again) before determining an end of trials at block 123 to block 125.

Referring now to FIG. 8, there is shown a flow chart of source roving processing. FIG. 8 is integrally coupled to the machine operating system. For convenience, during roving, the target machine that is executing the program and attempting to rove the program to another target machine is referred to as the source target machine. First, the source target preempts process execution, at block 131. The source target ensures that execution is beyond the last contiguous PIM set bit instruction, which is added to the code segment by the compiler or assembler. Then, the source target saves the thread registers at block 133. Then, at block 135 the source target saves the CS pointer, the DS and ES pointers and the stack pointers for all threads. Then, the source target saves the dynamically allocated memory, the task control block list information including any parameters of opened files, and the associated PIM information to a file, at block 137. The source target saves the extents of the code segment, data segment, and stack segment, with thread extents in the stack segment, at block 139. Finally, the source target copies the code segment, data segment and stack segment to a file, or files, according to the extents, at block 141. If, at decision block 143, processing is not in a DLL at the time of preemption, then the source target transmits a destination roving request along with the Qualifile, any redirection information, open file information, the PIM information, the handle and all information from previous steps to the new destination target machine, at block 145. The handling of the destination roving request will be discussed in FIG. 13 (blocks 245, 247). Block 145 closes any opened files solely associated with the executable. If, at decision block 143, the program is executing in a DLL at the time of preemption, then the source target saves all applicable DLL pointers, at block 147, saves the data segment PIM information, if applicable, at block 149, saves the extents of the applicable DLL code segment and data segment, at block 151, and copies the applicable DLL code segment, data segment, and stack segment to a file or files according to the extents at block 153. Then, processing continues at block 145. After the source target has transmitted the information at block 145, the source target kills the PID in the corresponding entry from the termination table, thus terminating all process threads, at block 155, kills the STDIN, STDOUT, and resource validation threads, at block 157, and deletes the termination table entry, at block 159.

Figure 9:
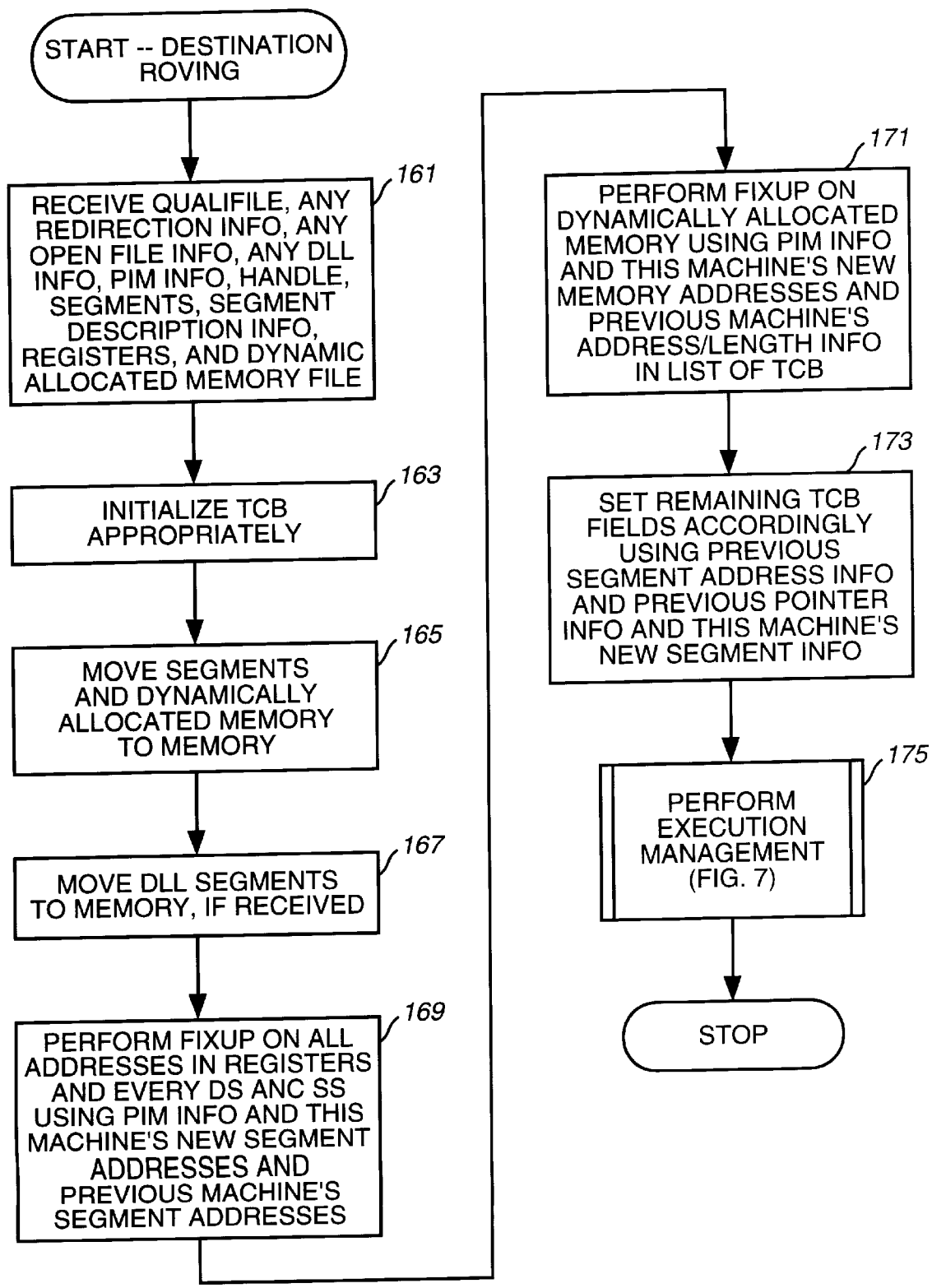
FIG. 9 is a flowchart of destination roving processing according to the present invention.

Referring now to FIG. 9, there is shown destination roving processing. FIG. 9 is integrally coupled to the machine operating system. The destination target machine receives the Qualifile, any redirection information, open file information, any DLL information, the PIM information, the handle, the segments, the segment description information, the registers, and dynamically allocated memory file, at block 161. Block 161 receives all data sent by block 145 of FIG. 8. Then, the destination target machine initializes the TCB appropriately, at block 163. Any files that were open at the time of preemption are also appropriately restored for proper access. The destination target moves the segments and dynamically allocated memory to its own memory at block 165 and moves the DLL segments, if any, to memory, at block 167. Then, the destination target machine performs fix up on all addresses and registers and every data segment and stack segment using the PIM information and the destination target machine's new segment addresses and previous machine segment addresses, as indicated at block 169. Similarly, the destination target machine performs fix up on dynamically allocated memory using the PIM information and the destination target machine's new memory addresses and the previous machine's address/length information in the list of the TCB, at block 171. Finally, the destination target machine sets the remaining TCB fields accordingly using previous segment address information and previous pointer information and the destination target machine's new segment information, at block 173. After the foregoing information has been moved into the destination target machine's memory and the destination target machine has performed address fix up, then the destination target performs execution management, indicated generally at block 175, which was described in detail with respect to FIG. 7.

Thus, a program may rove in the network for executing according to performance constraints governed by the Qualifile predicate. The user at the source machine is able to provide input to the program and see output from the program as though it were executing locally, without regard for where it may currently be executing.

Figure 10:
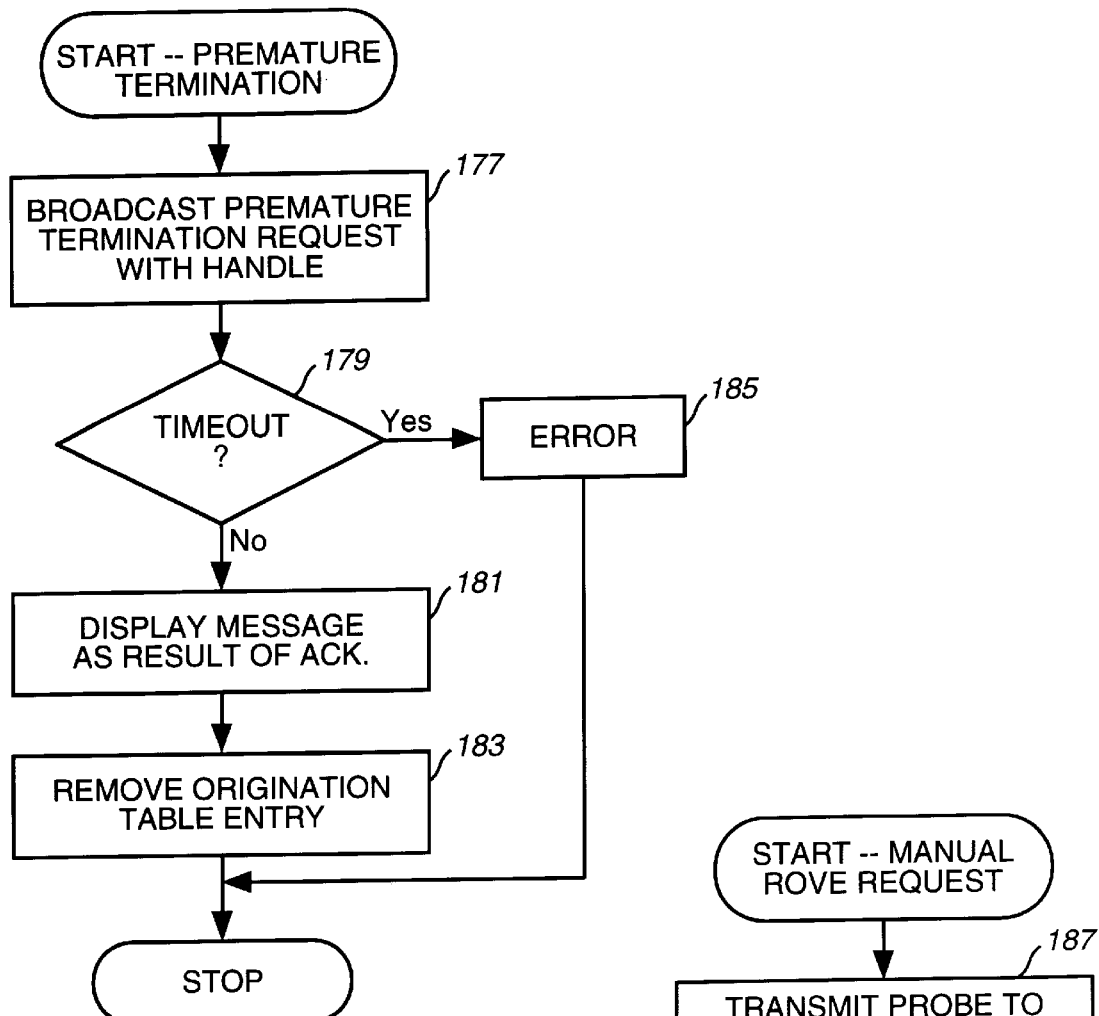
FIG. 10 is a flowchart of premature program termination processing according to the present invention.

During execution of the program in the network, the source machine can prematurely terminate execution of the program in the network. Referring to FIG. 10, in order to prematurely terminate execution, the source machine broadcasts a premature termination request with the correlation handle, at block 177. For example, a user may hit CTRL-break to the spawned program in a full screen session which would cause termination of the program in the network. The origination table entry for the program is accessed. The target machines of the network receive the premature termination broadcast request and perform processing illustrated in FIG. 13 (blocks 235, 237, 239, 241, 243). If the target machine is not executing the program, it ignores the request. If, on the other hand, the target machine is executing the program, it performs termination processing and transmits an acknowledgment output message of termination. If, at decision block 179, the source machine receives a termination acknowledgment before time out, the source machine displays the received termination output message as a result of the acknowledgment, at block 181, and removes the origination table entry for the terminated program, at block 183. If, at decision block 179, time out occurs before the source machine receives any termination acknowledgment, then the source machine displays an error (e.g. to the user), at block 185 and the process ends.

Figure 11:
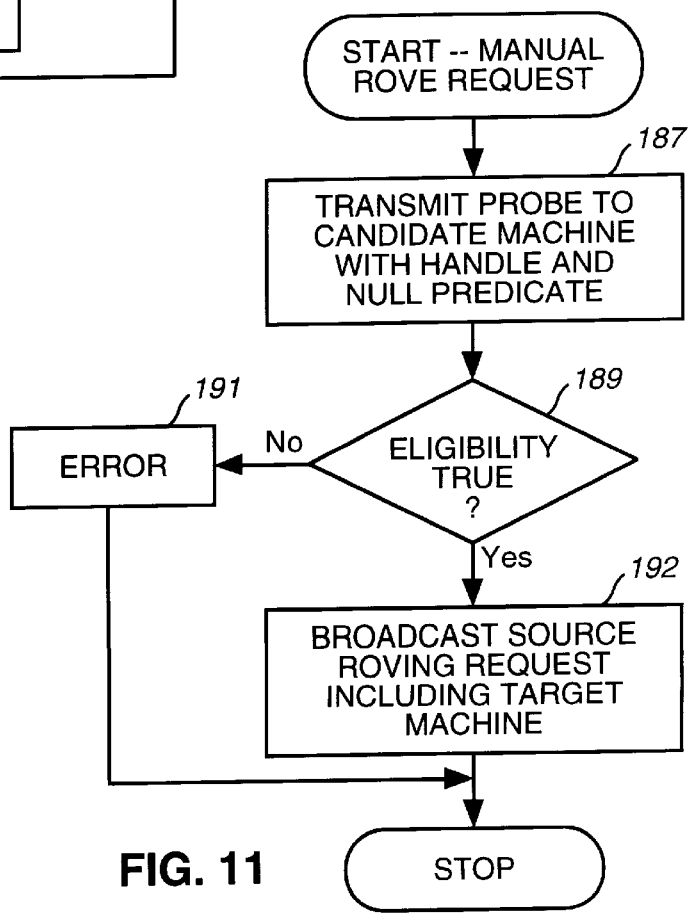
FIG. 11 is a flowchart of manual rove request processing according to the present invention.
Figure 13:
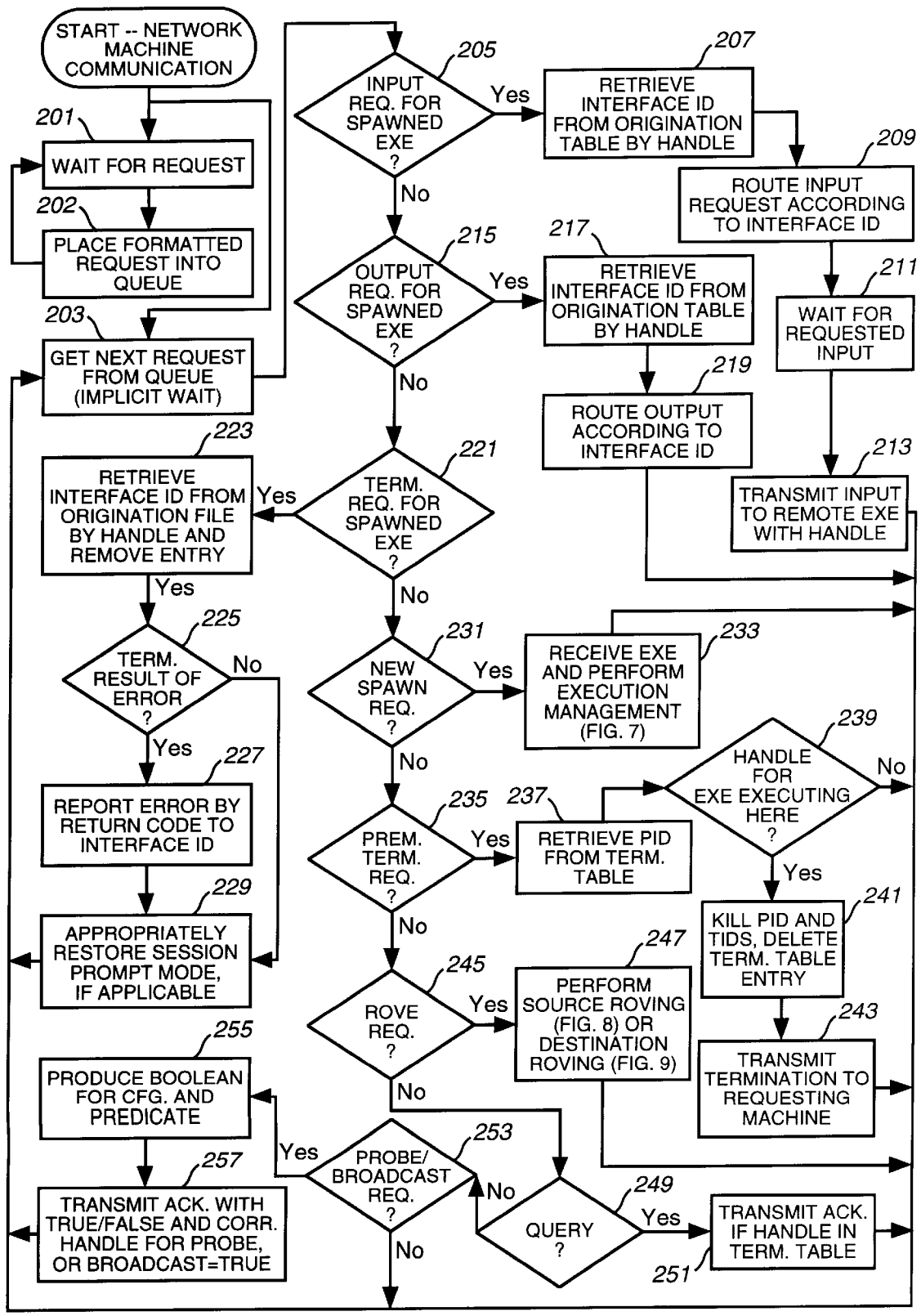
FIG. 13 is a flowchart of network machine communication server processing according to the present invention.

In addition to automatic roving, which was described with respect to FIGS. 7–9, the source machine can cause execution of the program to rove from one target machine to another, for example when a user wants to manually rove the program. Referring to FIG. 11, during manual roving, the source machine transmits a performance probe to the new proposed target machine with the correlation handle and a null predicate, at block 187. Since the predicate is null, the candidate machine should send a true acknowledgment. A manual rove is an unconditional rove without regard for the Qualifile predicate. If, at decision block 189, the target machine does not receive a true acknowledgment, an error is displayed at block 191 and processing ends. In response to a true acknowledgment, the source machine broadcasts a source roving request to the currently executing target machine along with the identity of the new target machine at block 191. FIG. 13 (blocks 245, 247) receives the source rove request.

Figure 12:
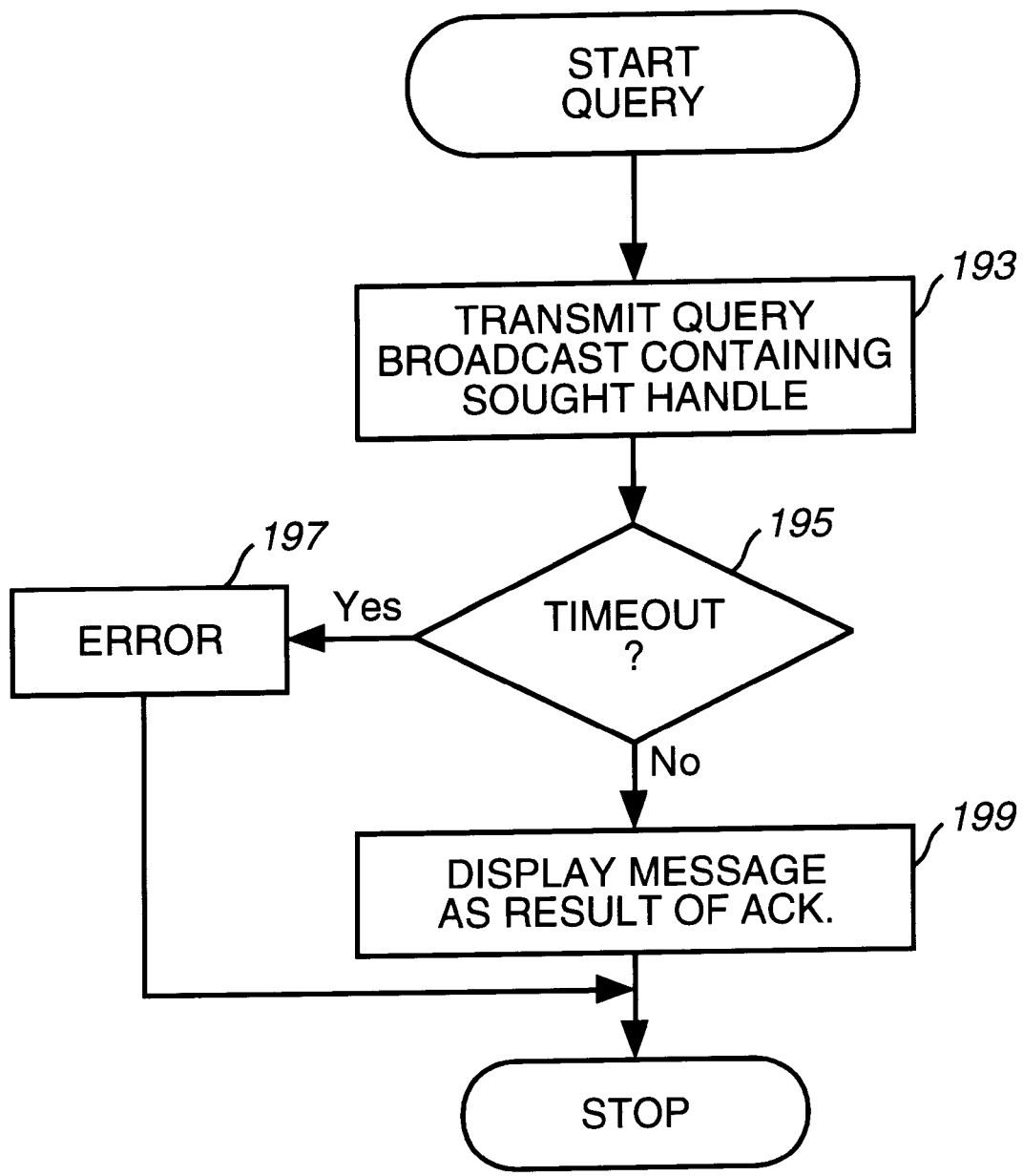
FIG. 12 is a flowchart of query processing according to the present invention.

Occasionally, the user of the source machine may wish to know where in the network the program is currently being executed. Accordingly, a query facility is provided. Referring to FIG. 12, query processing begins with the source machine transmitting a broadcast query containing the handle from the origination table, at block 193. As will be explained with respect to FIG. 13 (blocks 249, 251), the target machines receive the broadcast query and search their termination tables for the presence of the handle. The target machine that is executing the program transmits an acknowledgment and the other machines that are not executing the program ignore the query. If, at decision block 195, the source machine times out before receiving an acknowledgment, an error is displayed at block 197 and processing ends. If an acknowledgment is received before time out, then the source machine displays an output message as a result of the acknowledgment containing the machine address of the machine currently executing the program, at block 199, and processing ends.

Referring now to FIG. 13, there is shown the network machine server process that is executing on all participating source and target machines of the network. The FIG. 13 server process is preferably one or more threads for receiving requests (blocks 201, 202) and one or more threads for processing the requests, each of which is identical processing (all blocks except 201, 202). A machine in the network waits for requests at block 201 and whenever a network machine receives a request, the receiving machine places the formatted request in a queue, at block 202, and processes the request in the queue according to remaining blocks of FIG. 13. The machine gets the next request from the queue, at block 203 (waits until request is in the queue if necessary), and processes the request according to its type. If, at decision block 205, the request is an input request from a target to the source machine for a spawned program, the source machine retrieves the interface identifier (ID) from the origination table by its handle, at block 207. An example of an interface ID is a window ID or screen group ID. Then, at block 209, the source machine routes the input request according to the interface ID and waits for the requested input, at block 211. When the source machine receives the requested input, the source machine transmits the input to the executing target machine with the handle, at block 213 and processing continues at block 203.

If, at decision block 215, the request is an output request to the source machine for a spawned program, the source machine retrieves the interface ID from the origination table by handle, at block 217, and routes the output from the remote program according to the interface ID, at block 219. Processing then returns to block 203.

If, at decision block 221, the received request is a termination request to the source machine for a spawned program, which was described at block 113 of FIG. 7, the source machine retrieves the interface ID from the origination table by handle and removes the appropriate entry, at block 223. If, at decision block 225, the termination request indicates that the termination did not result from an error, processing continues to block 229. If, however, the termination did result from an error, then the source machine reports the error by return code in the received request to the interface ID, at block 227, and appropriately restores a prompt mode, if applicable, at block 229. Processing then returns to block 203.

The foregoing request messages discussed in connection with FIG. 13 are all directed from a target machine to the source machine that spawned the program to the network and are processed at the source machine. The remaining messages processed according to FIG. 13 are requests received by a target machine in the network and are processed at the target machine. As those skilled in the art will recognize, each machine of the network can be a source machine, target machine, or both.

If, at decision block 231, the request is a new spawn request generated by a source machine at block 67 of FIG. 5, the target machine addressed by the new spawn request receives the EXE and performs execution management processing according to FIG. 7, at block 233. If, at decision block 235, the request is a premature termination request, as described with respect to FIG. 10, the target machine retrieves the program identifier from its termination table, at block 237. The target machine tests, at decision block 239, whether or not the program is executing in that machine. If not, the target machine ignores the request and processing continues at block 203. If, at decision block 239, the handle for the program is executing at the receiving target machine, the target machine kills the program and all threads executing with respect to the program and deletes the termination table entry, at block 241. Then, the receiving target machine transmits a termination output message to the requesting machine (for display to user by way of block 215 at requesting machine) at block 243, and processing continues at block 203.

If, at decision block 245, the target machine receives a rove request, which may be either a manual rove request described with respect to FIG. 11 or a destination roving request described with respect to FIGS. 7–9, the target machine performs source roving or destination roving, as appropriate (according to type of rove request determined at block 245), as indicated at block 247, and processing continues at block 203.

If, at decision block 249, the request is a query, which was described with respect to FIG. 12, the receiving target machine transmits an acknowledgment if the handle of the query is in its termination table, at block 251, and processing continues at block 203. Finally, if at decision block 253, the request is a probe or broadcast request, then the target machine produces a boolean for its local candidate configuration and the predicate in the probe or broadcast, at block 255. The target machine transmits an acknowledgment with the appropriate true or false response, along with the correlation handle from the probe, if applicable, in block 257. Block 255 first validates that the source machine's address is contained in the local candidate configuration to assure the source machine, or intermediate target, is eligible to spawn programs to this target machine. If true (i.e. is contained there), then a non-null predicate is compared to the current system performance constraints for a final boolean disposition of target machine eligibility. Block 257 then responds to the probe or broadcast.

From the foregoing, those skilled in the art will recognize that the present invention overcomes the shortcomings of the prior art by enabling a program to be spawned to a communications network. After the program has been spawned to a qualified machine of the network, input and output requests are routed to the spawning source machine. If the target machine on which the program is executing fails to meet performance constraints, the target machine roves execution of the program to another qualified target machine transparently to the user of the source machine.

What is claimed is:

1. A method of executing a program in a network environment, said network including a source machine and a plurality of target machines, which comprises the computer implemented steps of:

selecting an available target machine from a list of target machines capable of executing said program;

transmitting from said source machine to said selected target machine an execution command for said program, said list of target machines, and a handle; and, launching said program on said selected target machine.

2. The method as claimed in claim 1, including the computer implemented step of:

routing input and output requests for said program from said selected target machine to said source machine.

3. The method as claimed in claim 1, including the computer implemented step of:

monitoring execution of said program on said selected target machine.

4. The method as claimed in claim 3, wherein said step of monitoring execution of said program is performed by said selected target machine.

5. The method as claimed in claim 3, including the computer implemented step of roving said program to another target machine of said network.

6. The method as claimed in claim 5, wherein said roving step includes the computer implemented steps of:

selecting a next available target machine from said list of target machines;

preempting execution of said program on said selected target machine;

saving program execution information for said preempted program;

transmitting from said selected target machine to said selected next available target machine an execution command for said program, said saved program execution information, said list of target machines, and said handle; and, launching said preempted program on said selected next available target machine.

7. The method as claimed in claim 6, wherein said step of launching said preempted program on said selected next available target machine includes the computer implemented steps of:

moving said saved program execution information transmitted from said selected target machine into memory of said selected next available target machine; and, executing said preempted program on said selected next available target machine.

8. The method as claimed in claim 7, including the computer implemented step of:

routing input and output requests for said program from said selected next available target machine to said source machine.

9. The method as claimed in claim 7, including the computer implemented step of:

monitoring execution of said program on said selected next available target machine.

10. The method as claimed in claim 9, including the computer implemented step of roving said program from next available target machine to another target machine of said network.

11. A method of executing a program in a network environment, said network including a source machine and a plurality of target machines, which comprises the computer implemented steps of:

selecting an available target machine from a list of target machines capable of executing said program;

transmitting from said source machine to said selected target machine an execution command for said program, said list of target machines, and a handle;

launching said program on said selected target machine;

registering said program with a program identifier and said handle in a termination table of said selected target machine; and, registering said program as being launched on a target machine in an origination table of said source machine.

12. The method as claimed in claim 11, including the computer implemented step of:

routing input and output requests for said program from said selected available target machine to said source machine.

13. The method as claimed in claim 12, wherein said step of routing input and output requests comprises the computer implemented steps of:

spawning a standard output thread on said selected available target machine; and, spawning a standard input thread on said selected available target machine.

14. The method as claimed in claim 13, including the computer implemented steps of:

registering said spawned standard output thread in said termination table of said selected available target machine with a thread identifier; and, registering said spawned standard input thread in said termination table of said selected available target machine with a thread identifier.

15. The method as claimed in claim 11, including the computer implemented step of:

monitoring execution of said program on said selected available target machine.

16. The method as claimed in claim 15, wherein said step of monitoring execution of said program on said selected available target machine includes the computer implemented steps of:

spawning a resource validation thread on said selected available target machine, said resource validation thread periodically determining if performance constraints for said program are exceeded; and, registering said spawned resource validation thread in said termination table of said selected available target machine with a thread identifier.

17. The method as claimed in claim 16, including the computer implemented step of roving said program to another target machine of said network if said resource validation thread determines performance constraints for said program are exceeded.

18. The method as claimed in claim 17, wherein said roving step includes the computer implemented steps of:

selecting a next available target machine from said list of target machines;

preempting execution of said program on said selected target machine;

saving program execution information for said preempted program;

transmitting from said selected target machine to said selected next available target machine an execution command for said program, said saved program execution information, said list of target machines, and said handle;

killing said resource validation thread for said preempted program on said selected target machine;

deleting said program identifier and said handle for said preempted program from said termination table of said selected target machine;

launching said preempted program on said selected next available target machine;

registering said preempted program with a program identifier and said handle in a termination table of said selected next available target machine.

19. The method as claimed in claim 18, wherein said step of launching said preempted program on said selected next available target machine includes the computer implemented steps of:

moving said saved program execution information transmitted from said selected target machine into memory of said selected next available target machine; and, executing said preempted program on said selected next available target machine.

20. The method as claimed in claim 19, including the computer implemented step of:

routing input and output requests for said program from said selected next available target machine to said source machine.

21. The method as claimed in claim 20, wherein said step of routing input and output requests comprises the computer implemented steps of:

spawning a standard output thread on said selected next available target machine; and, spawning a standard input thread on said selected next available target machine.

22. The method as claimed in claim 21, including the computer implemented steps of:

registering said spawned standard output thread in said termination table of said selected next available target machine with a thread identifier; and, registering said spawned standard input thread in said termination table of said selected next available target machine with a thread identifier.

23. The method as claimed in claim 20, including the computer implemented step of:

monitoring execution of said program on said selected next available target machine.

24. The method as claimed in claim 23, wherein said step of monitoring execution of said program on said selected available target machine includes the computer implemented steps of:

spawning a resource validation thread on said selected next available target machine, said resource validation thread periodically determining if performance constraints for said program are exceeded; and, registering said spawned resource validation thread in said termination table of said selected next available target machine with a thread identifier.

25. The method as claimed in claim 24, including the computer implemented step of roving said program to another target machine of said network if said resource validation thread determines performance constraints for said program are exceeded.

26. The method as claimed in claim 11, including the computer implemented step of building said list of machines capable of executing said program.

27. The method as claimed in claim 26, wherein said step of building said list of machines capable of executing said program includes the computer implemented steps of:

broadcasting from said source machine over said network a message with a predicate, said predicate specifying machine capabilities required to execute said program;

receiving said message at a receiving target machine;

determining at said receiving target machine if said receiving target machine has the machine capabilities specified in said predicate;

transmitting a response message from said receiving target machine to said source machine, said response message stating whether or not said receiving machine has the machine capabilities specified in said predicate;

receiving said response message at said source machine; and, listing said receiving target machine in said list target machines capable of executing said program.

28. The method as claimed in claim 11, wherein said step of selecting an available target machine form said list of target machines includes the computer implemented steps of:

transmitting a message from said source machine to a target machine of said list, said message requesting availability to execute said program;

receiving said message at said target machine;

determining at said target machine whether or not said target machine is available to execute said program;

transmitting a response message from said target machine to said source machine stating whether or not said target machine is available to execute said program.

29. The method as claimed in claim 11, including the computer implemented step of determining where in said network said program is executing.

30. The method as claimed in claim 29, wherein said step of determining where in said network said program is executing includes the computer implemented steps of:

broadcasting a query from said source machine, said query including said handle;

receiving said query at a target machine;

determining if said handle is in the termination table of said target machine;

transmitting an acknowledgment to said source machine if said handle is in the termination table of said target machine.

* * * * *